United States Patent [19]
Föhl

[11] Patent Number: 4,475,745
[45] Date of Patent: Oct. 9, 1984

[54] SEAT BELT DRIVE DEVICE
[75] Inventor: Artur Föhl, Schorndorf, Fed. Rep. of Germany
[73] Assignee: Repa Feinstanzwerk GmbH, Alfdorf, Fed. Rep. of Germany
[21] Appl. No.: 417,073
[22] Filed: Sep. 13, 1982
[30] Foreign Application Priority Data
Sep. 14, 1981 [DE] Fed. Rep. of Germany ....... 3136336
[51] Int. Cl.³ .............................................. B60R 21/10
[52] U.S. Cl. ..................................................... 280/804
[58] Field of Search ................................ 280/802, 804
[56] References Cited
U.S. PATENT DOCUMENTS
3,856,327 12/1974 Otani ..................................... 280/802
4,061,365 12/1977 Nagano et al. ....................... 280/804
4,070,040 1/1978 Igeta ..................................... 280/804
4,220,355 9/1980 Henderson et al. ................. 280/804

FOREIGN PATENT DOCUMENTS
123542 9/1980 Japan ................................... 280/804

Primary Examiner—Joseph F. Peters, Jr.
Assistant Examiner—Kenneth R. Rice
Attorney, Agent, or Firm—Yount & Tarolli

[57] ABSTRACT

Drive device for moving the end fitting of a passive safety belt along a predetermined motion path which has in particular track sections extending at an angle to each other, by means of flexible tensioning means which can be driven by an electric motor drive, which is coupled to the end fitting to be moved. A flexible endless cable is provided which is connected to a coupling fitting and is guided at least at the deflection points on guidance and deflection elements, preferably on rolling elements, is provided as tensioning means.

4 Claims, 6 Drawing Figures

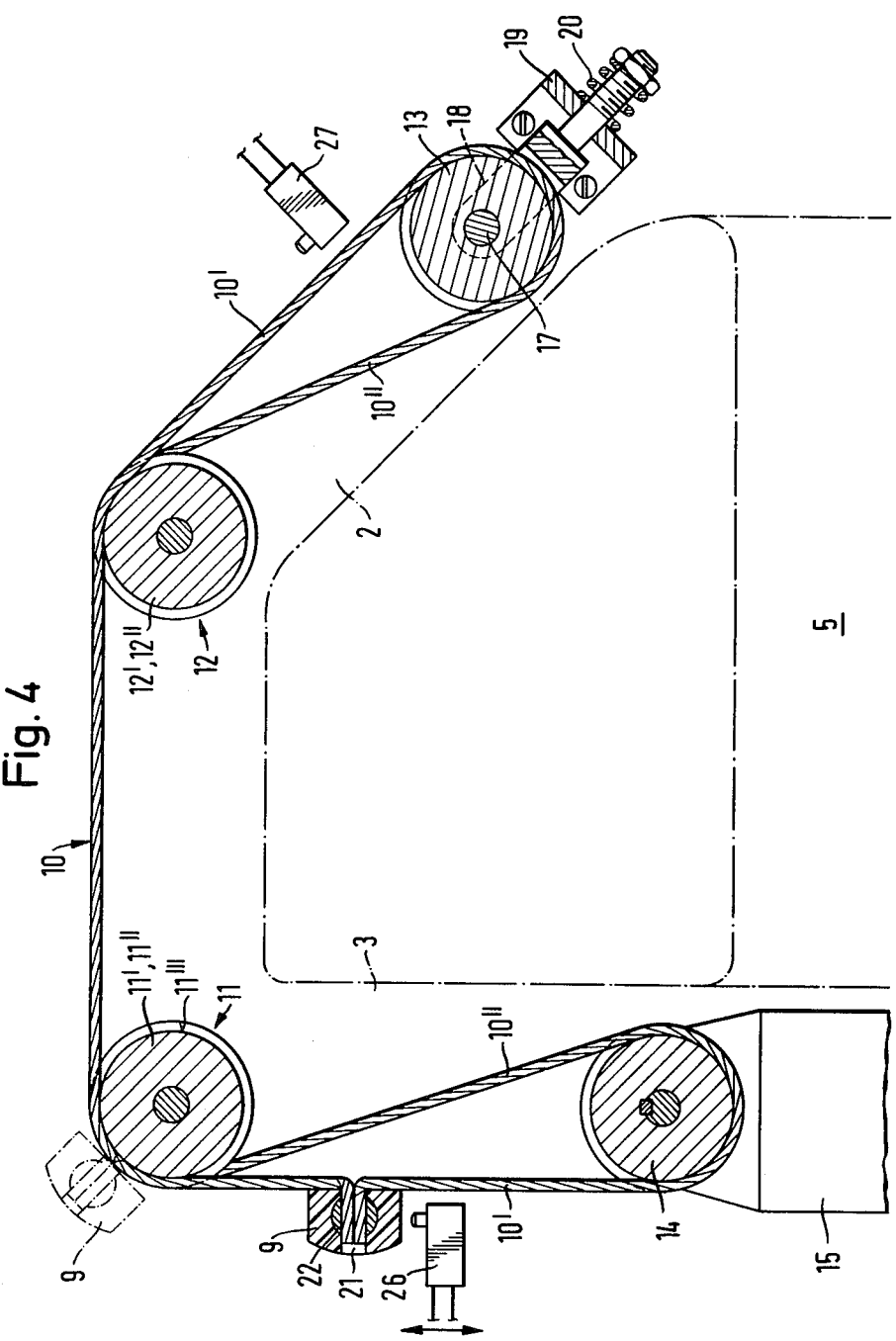

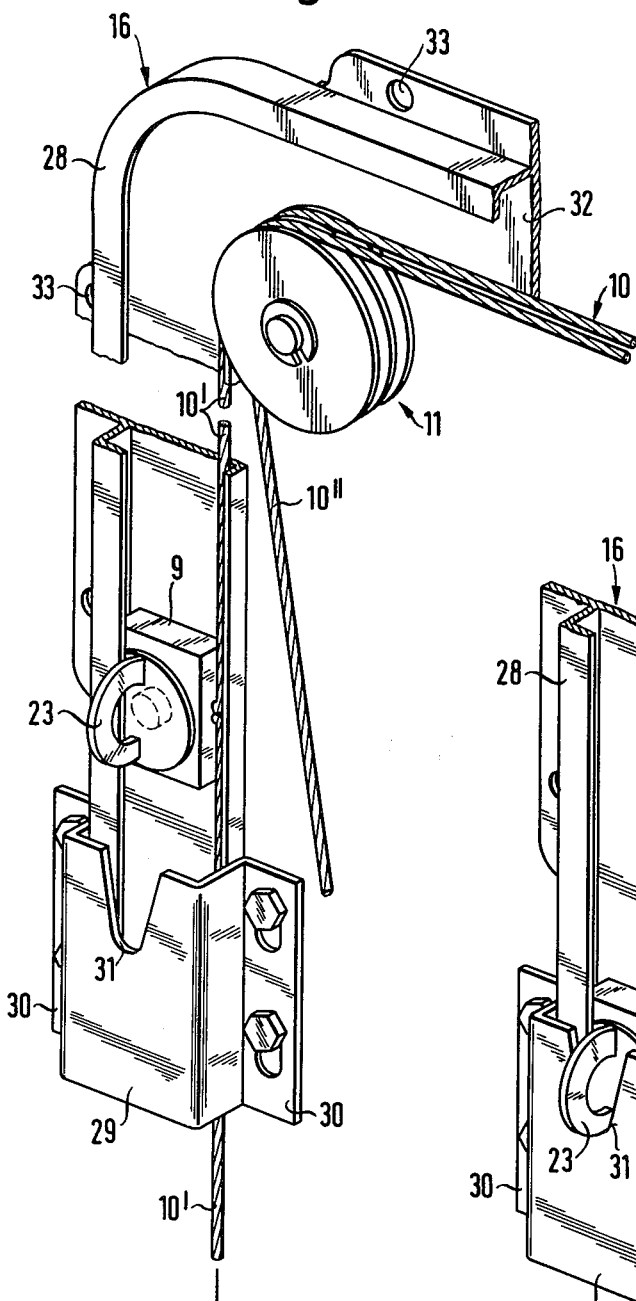

SEAT BELT DRIVE DEVICE

BACKGROUND OF THE INVENTION

1. Field of the Invention

The invention relates to a drive device for moving the end fitting of a passive safety belt along a predetermined motion path which has in particular track sections extending at an angle to each other, by means of flexible tensioning means which can be driven, preferably by an electric motor drive.

2. Description of the Prior Art

In passive safety belt systems for motor vehicles it is known to make the end-fitting point of the belt movable in the motor vehicle along a track, in such a manner that before the person to be protected comes aboard, this end-fitting point is first located in the vicinity of the so-called A-post and with or after the boarding, is moved along the guide track into the region of the B-post. In this connection, drive devices, for instance in the form of flexible flat plastic belts or in the form of plastic jacketed steel cables, tensioning means are guided in continuous, correspondingly curved guiding tracks. These drive devices can be driven for instance, by electric motors, for instance by providing the flat plastic belt with a perforation which is connected to a seat driven by an electric motor. In both cases there is the disadvantage that when the tensioning means are driven, especially in the case of a push drive, the tensioning means buckles in the curved regions more or less strongly, which buckling together with increased friction between the tensioning means and the guide, makes it necessary to use a correspondingly strong drive.

SUMMARY OF THE INVENTION

An object of the invention is to provide a drive device of the type mentioned which is of simple design and in which large friction forces are avoided with certainty and also considerable freedom is provided with respect, for instance, to the spatial arrangement of the path of motion.

With the foregoing and other objects in view, there is provided in accordance with the invention a drive device for moving an end fitting of a passive safety belt along a predetermined motion path which has sections extending at an angle to each other comprising flexible tensioning means coupled to the end fitting to be moved, driving means for driving the flexible tensioning means, the combination therewith of a flexible endless cable as the tensioning means, said flexible endless cable connected to a coupling fitting, and guidance and deflection elements disposed at deflection points along the motion path to guide the flexible endless cable.

Other features which are considered as characteristic for the invention are set forth in the appended claims.

Although the invention is illustrated and described herein as embodied in a drive device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which:

FIG. 4 is a cross-sectional view of the drive device in FIG. 3.

FIGS. 5 and 6 show perspective views of an end region of the operating device in two different operating positions. In the end region mounted on the B-post is a stable anchor plate with a V-shaped slot. FIG. 5 shows the coupling fitting shortly before reaching the end position. FIG. 6 shows the fitting part of the coupling fitting in the V-shaped slot which is in the operating position.

DETAILED DESCRIPTION OF THE INVENTION

Figure 1:
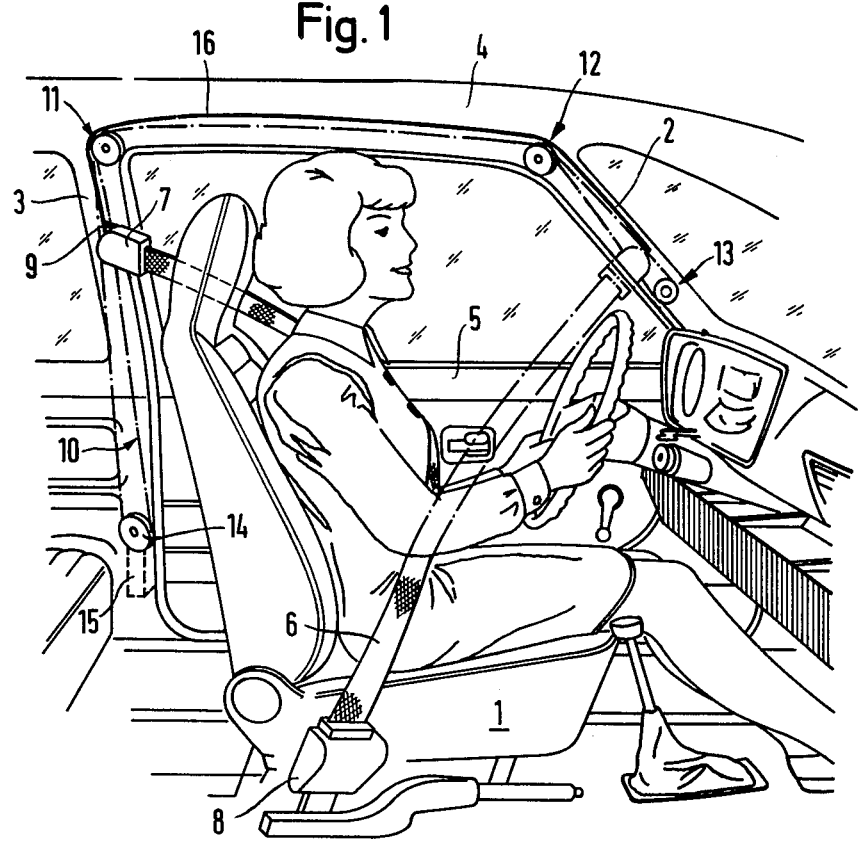
FIG. 1 diagrammatically illustrates a perspective view of part of a motor vehicle with the driver seated therein and with the drive device according to the invention, installed in the actuated position.

In accordance with the invention, the tensioning means is a flexible endless cable which is connected to a coupling fitting and the cable guided at deflection points on guidance and deflection elements, preferably on rolling elements.

The above-mentioned disadvantages are avoided by the drive device of the invention. In particular, the tensioning means is prevented, for instance in the area of curvatures of the path of motion, from being lifted or bent away from the intended position, which thereby eliminates increased friction forces. The invention furthermore provides the greatest possible freedom with respect to the course of the path of motion and with respect to the course of motion of the coupling fitting, to which the one end of the safety belt is fastened. Thus, the coupling fitting can also execute spatial twists in the course of the path of motion, for instance due to a corresponding inclined position of the guide or deflection elements. In contrast to the known embodiments described at the outset, in which the friction forces are influenced negatively by greatly varying temperatures, such negative influence does not exist in the drive device according to the invention. A further advantage results from the invention in that very small deflection radii can be negotiated at the deflection points in the course of the path of motion, since at these points there are no backing-up forces buckling or the like during forward as well as during backward motion of the tensioning means.

According to a further embodiment of the invention, the design of the drive of the tensioning means is made very simple by the feature that a drive pulley is provided which can be driven by a motor and/or by hand and over which the cable is looped several times. Friction forces are obtained at the drive pulley between the tensioning means and the preferably smooth surface of the driving pulley such that the tensioning means do not slip-through on the drive pulley, i.e. a sufficient coupling connection is provided between the drive and the tensioning means. Friction forces between the drive pulley and the tensioning means are obtained especially if the tensioning means is under continuous pretension, i.e., is made taut by a resiliently pretensioned deflection pulley. A small pretension of the tensioning means is sufficient to obtain the friction force between the tensioning means and the drive.

In a further advantageous embodiment of the invention, the coupling fitting is guided in a stationary guiding track, preferably in a guide rail shaped in accordance with the path of motion of the tensioning means. If is of advantage here to design the dimensions of the guiding rail, made for instance of extruded aluminum sections, so that it can take up the normal pulling forces which occur when the coupling element is moved.

Further advantageous details of the invention will be seen from the embodiment example which is shown in the drawings and will be described in the following.

Figure 2:
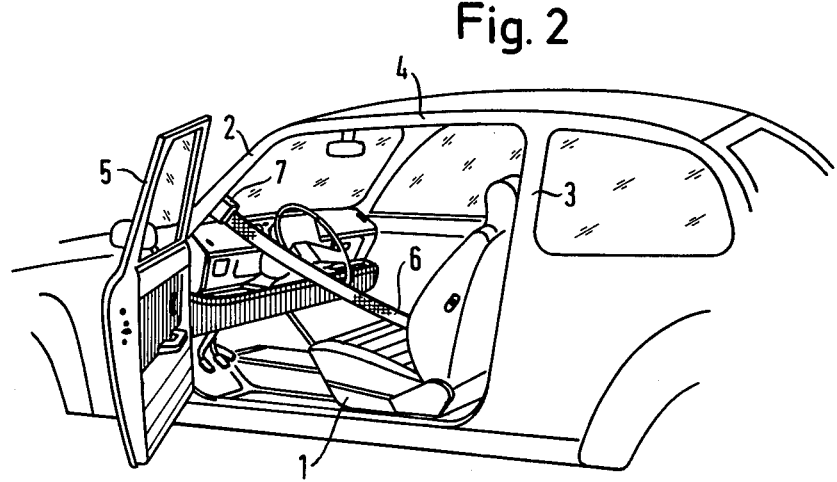
FIG. 2 illustrates another perspective view of part of the motor vehicle without the driver, but with the vehicle door open to show the drive device in the non-activated position.

FIG. 1 shows the interior of a passenger motor vehicle, and specifically the area of the drive seat 1, the A-post 2 of the vehicle body and the B-post 3, between which posts 2 and 3 extends a horizontal vehicle strut 4. The vehicle door 5 is on the driver's side. A passive safety belt system is provided for protection of the vehicle passenger shown. The passive belt system has a flexible belt 6 which extends around the upper part of the body of the vehicle passenger, is locked detachably with a plug part in a belt lock 7, and is connected with the other belt end to a known automatic belt wind-up device 8, by which the belt 6 is pulled taut against the vehicle passenger with pretension. That end of the belt 6 at which the belt lock 7 is disposed in the embodiment example according to FIGS. 1 and 2, is fastened directly via the belt lock 7 or, deviating from the embodiment example, indirectly to a coupling fitting 9 which will later be described in detail, and is in turn connected to a flexible tensioning means 10 in the form of an endless cable. This tensioning means 10 is led by deflection elements 11, 12 and 13 in the form of pulley-like rolling elements, along a guidance or motion track deflected several times and has as the drive a drive pulley 14 with an electric drive motor 15. The path of motion of the tensioning means 10 and thereby of the coupling fitting 9 extends vertically along the B-post to the deflection element 11, from there, on the roof side and horizontally, above the vehicle door 5, to the deflection element 12, and then at an angle downward along the A-post 2 to the deflection element 13 on the front side. A guide track 16 fastened firmly to the motor vehicle extends substantially parallel to the path of motion of the tensioning means 10, in the form of an extruded aluminum profile bent several times, in which the coupling fitting 9 runs and is guided during its motion from the rest or boarding position (dash-dotted position of the belt 6) into the working or operating position illustrated by continuous lines. The belt 6 fastened to the coupling fitting 9 permits the motor vehicle to be boarded in the boarding position and is moved, after the drive 14/15 is operated, by moving the tensioning means 10, backward into the working or operating position in which it protects the vehicle passenger in the usual manner. The automatic winding-up device 8, as is usual, contains a locking system which blocks the belt 6 instantly in the event of an extreme acceleration or deceleration of the vehicle and prevents the vehicle passenger from falling forward.

FIG. 2 shows the boarding position of the belt 6 with the belt lock 7 and with the vehicle door 5 open. Within the scope of the invention it is, of course, possible to arrange the belt 6 firmly fixed at the coupling fitting 9 and to a belt lock fastened, for instance, at the bottom of the vehicle in such a manner that it can be wound up.

Figure 3:
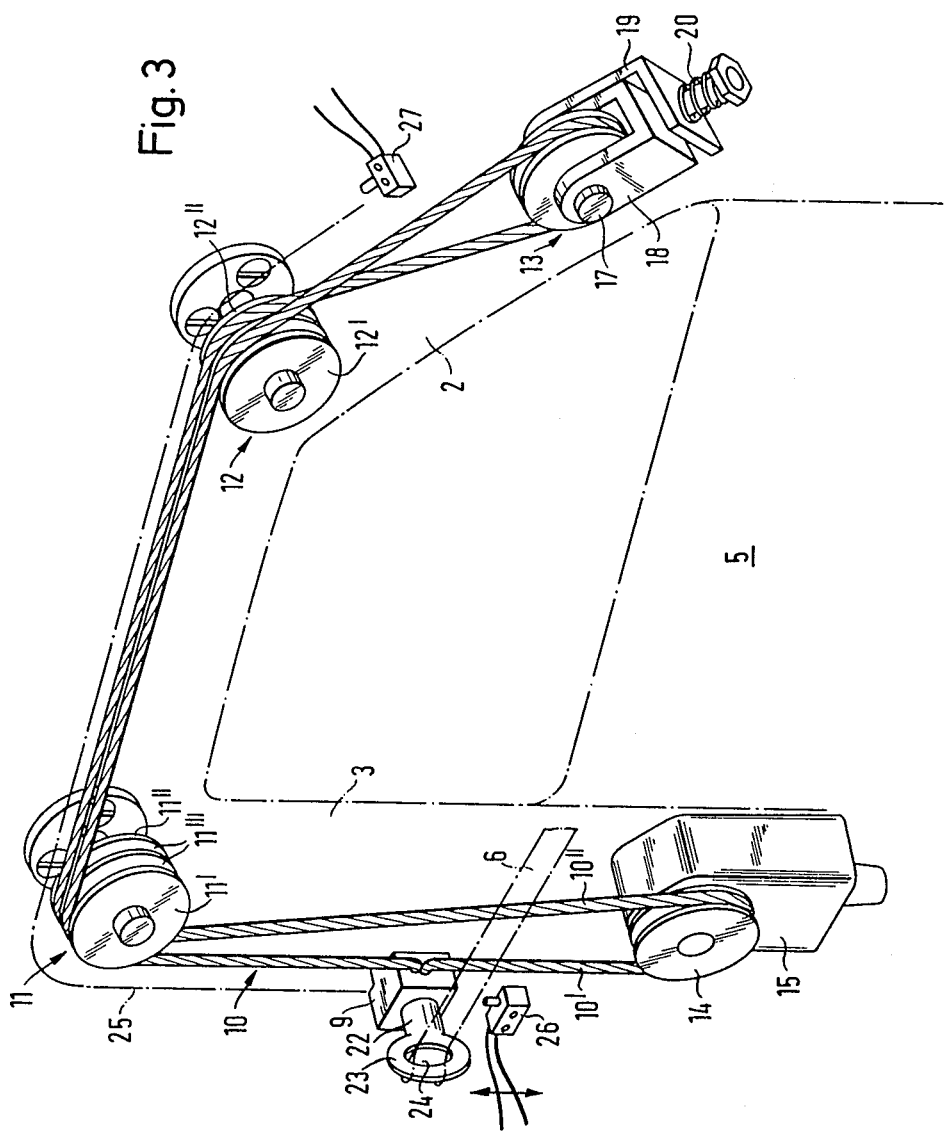
FIG. 3 diagrammatically illustrates in a perspective view the drive device as a detail in which the flexible tensioning means is a steel cable moved by a motor driven drive pulley over deflection elements in the form of pulleys. The ends of the cable are fastened in a coupling fitting to which is fastened one end of the belt.

In FIGS. 3 and 4, the driving device for the belt 6 is shown as a detail. The flexible tensioning means 10, for instance, in the form of a steel cable, is looped several times with increased friction due to the $e^{\mu a}$ effect around the basically smooth drive pulley 14 which may be provided with lateral flange shoulders. The two tensioning means cables 10' and 10" from pulley 14 are fed to the deflection element 11, which consists of two pulleys 11' and 11" which are mounted on a common axle and can rotate relative to each other, and then to the deflection element 12 which likewise consists of two pulleys 12' and 12". From there, the tensioning means are fed to the deflection element 13 which likewise is designed in the form of a pulley. All deflection elements are fastened, at least largely, fixed at the motor vehicle with the exception of the deflection element 13. The axis of rotation 17 of the deflector element 13 is connected to a U-shaped pulling fork 18 which is supported in a fitting 19 and is pulled by a spring 20 against this fitting 19, tensioning the tensioning means 10. The deflection elements 11, 12 and 13 designed in the form of pulleys have concave running grooves, for instance 11''', with a depth of the grooves which corresponds approximately to the thickness or the diameter of the tensioning means 10. In this manner, the coupling fitting 9 which will be described in greater detail below, when negotiating the deflection radius, can traverse the corresponding deflection point on a very small radius, since the tensioning means have preferably a circular cross section. The individual pulleys of the deflection elements of course need not be arranged parallel to each other but may be arranged offset or in another configuration to each other. Also helical or otherwise intertwined sections in the path of motion of the tensioning means can be managed without difficulty since in this case the tensioning means 10 are twisted accordingly. The two free ends of the tensioning means 10 or the cable sections 10' and 10" are firmly connected to each other within the coupling fitting 9 which is designed in the form of a metallic, substantially rectangular block and has a recess 21 for the tensioning means ends. Into this recess 21 are inserted the two tensioning means ends and the ends are clamped and locked with each other by means of a clamping screw 22. The clamping screw 22 may be part of a fitting 23 which may be designed in the form of an eye with an eye opening 24, and to which the belt 6 is fastened, for instance, by sewing.

The motion or guidance path of the coupling fitting 9 (FIG. 3) is illustrated by the dash-dot line designated by numeral 25. At the two end positions of this guiding track 25 are shown electric end switches 26 and 27, which are fastened firmly to the vehicle frame, i.e. to the A-post and the B-post, where it is advantageous to support the end switch 26 movably in height, as indicated by the arrows, so that the coupling fitting can be brought into an advantageous end position according to the body size of a vehicle passenger. Through actuation of the end switches, the drive 14/15 is switched off when the respective end position is reached.

In FIGS. 5 and 6 is shown as a detail essentially that part of the drive device mounted at the B-post of the motor vehicle. The two pulling cables 10' and 10" are brought downward from deflecting element 11 to the drive pulley 14 of the tensioning means drive 14/15.

Guidance rail 16 was indicated only schematically in FIG. 1. In FIGS. 5 and 6, part of the guidance rail 16 is shown in detail. This guiding rail 16 which is formed according to the course of the path of motion of the tensioning means 10, has a substantially flat fastening plate 32 which is fastened to the vehicle frame at points 33. From this fastening plate 32 projects an L-shaped guide extension 28, in which the block-like coupling fitting 9 is guided and melo against pivotal movement inasmuch as one side of it extends behind this guiding extension 28. In this manner, the coupling fitting 9/23 connected to the belt 6 is secured against normal pulling forces which occur in the normal application and deposition of the safety belt and tend to pivot the coupling fitting relative to the cable. A stable anchor plate 29 which has a substantially U-shaped profile, has on both sides a mounting extension 30 for fastening the anchor plate 29 to the vehicle body, and which extends beyond the guiding rail 16 toward the passenger compartment. This anchor plate 29 has a substantially V-shaped slot 31 which is designed so that the fitting part 23 of the coupling fitting 9 can engage this slot 31 as shown in FIG. 6. In FIG. 5, the coupling fitting 9 is not yet in the end position, i.e. in the working or operating position, but slightly above this end position. The coupling fitting 9 is moved by the drive 14/15 by means of the tensioning means 10 up to the end position. As shown in FIG. 6, the fitting part 23 engages the slot 31 and the coupling fitting 9 directly behind the stable anchor plate 29, in which position it is secured against extreme pulling forces which become effective at the belt 6 in the event of a crash.

Within the scope of the invention, means can also be provided by which the tensioning means can be moved by hand, in the event the drive motor 15 fails. It should further be noted that through the use of flexible endless tensioning means, very small deflection radii can be negotiated at the deflection points, since no buckling forces of any kind are present there. Through a suitably inclined position of the deflection elements and by an inclined position or twisting of the guiding rail, the coupling fitting can also execute tilting motions on its guide path.

I claim:

1. An apparatus for moving one end of a seat belt between a release position in which the one end of the seat belt is located toward the front of the vehicle to facilitate movement of a person into and out of a vehicle and a retaining position in which the one end of the seat belt is located toward the rear of the vehicle to position the seat belt in an orientation in which it can be effective to restrain a person against movement relative to the vehicle, said apparatus comprising a cable forming a closed loop which has a first end portion located toward the rear of the vehicle and a second end portion located toward the front of the vehicle, a plurality of rollers disposed in engagement with said cable for guiding movement of said cable along a path having a generally horizontal main section which extends along an upper portion of a vehicle doorway, a rearward section which extends downwardly from a rearward end of the main section to a first one of said plurality of rollers, and a forward section which extends downwardly from a forward end of the main section to a second one of said plurality of rollers, said first roller being disposed in engagement with the first end portion of the closed loop formed by said cable and said second roller being disposed in engagement with the second end portion of the closed loop formed by said cable, connector means for use in connecting the one end of the seat belt to said cable, spring means connected with one of said first and second rollers for applying a biasing force against said one of said rollers to urge said one of said rollers away from the main section of the path to thereby tension the cable, drive means for rotating one of said first and second rollers to move said cable along the path, said drive means being operable in a first direction to move said connector means upwardly from a position in which the seat belt is in the retaining position along at least a portion of the rearward section of the path, to then move said connector means along the main section of the path, and to then move said connector means downwardly along at least a portion of the forward section of the path to a position in which the seat belt is in the release position, said drive means being operable in a second direction to move said connector means upwardly from the position in which the seat belt is in the release position along at least a portion of the forward section of the path, to then move said connector means along the main section of the path, and to then move said connector means downwardly along at least a portion of the rearward section of the path to a position in which the seat belt is in the retaining position.

2. An apparatus as set forth in claim 1 further including anchor means disposed along the rearward section of the path for holding said connector means and the one end of the seat belt against forward movement under the influence of forces applied to the seat belt when the seat belt is in the retaining position.

3. An apparatus as set forth in claim 2 wherein said anchor means includes means for defining a slot having a central axis extending parallel to a portion of said cable disposed along the rearward section of the path and an open upper end portion through which said connector means moves during downward movement of said connector means along the rearward section of the path, said connector means being movable upwardly out of the slot upon operation of said drive means to move said connector means upwardly toward the main section of the path.

4. An apparatus as set forth in claim 1 wherein said connector means includes a slide element which is connected to said cable for movement therewith and is adapted to be connected with the one end of the seat belt in a manner which tends to pivot said slide element relative to said cable upon the application of a load to the seat belt, said apparatus further including track means for guiding movement of said slide element along the path upon movement of said cable, said track means including elongated lip means which extends along the path and engages said slide element throughout the extent of movement of said slide element along the path to hold said slide element against pivotal movement relative to said cable.

* * * * *